(12) United States Patent
Feschuk

(10) Patent No.: US 7,237,307 B2
(45) Date of Patent: Jul. 3, 2007

(54) SLIP GRIP DEVICE

(76) Inventor: J Peter Feschuk, 4320 Hammond Bay Road, Nanaimo (CA) V9T 5A8

( * ) Notice: Subject to any disclaimer, the term of this patent is extended or adjusted under 35 U.S.C. 154(b) by 0 days.

(21) Appl. No.: 10/978,883

(22) Filed: Nov. 1, 2004

(65) Prior Publication Data

US 2005/0091801 A1 May 5, 2005

Related U.S. Application Data

(60) Provisional application No. 60/515,717, filed on Oct. 31, 2003.

(51) Int. Cl.
*F16G 11/00* (2006.01)

(52) U.S. Cl. .................... 24/115 R; 24/130; 24/265 R; 24/265 EC

(58) Field of Classification Search ............... 24/115 R, 24/130, 122.6, 265 R, 265 EC
See application file for complete search history.

(56) References Cited

U.S. PATENT DOCUMENTS

| 520,318 | A | 5/1894 | Knap |
|---|---|---|---|
| 860,189 | A | 7/1907 | Chatfield |
| 1,529,257 | A | 3/1925 | Lampl |
| 1,891,947 | A | 12/1932 | Powell |
| 2,159,223 | A | 5/1939 | Okun |
| 2,222,038 | A | 11/1940 | Larkin |
| 2,297,661 | A | 9/1942 | Okun |
| 2,631,449 | A | 3/1953 | Protsman |
| 2,877,527 | A | 3/1959 | Bond |
| 2,896,217 | A | 7/1959 | Cedarstaff |
| 3,187,396 | A | 6/1965 | Carroll |
| 3,296,669 | A | 1/1967 | Elder, Jr. |
| 3,364,500 | A | 1/1968 | Fox |
| 3,625,556 | A | 12/1971 | Stromberg |
| 3,630,555 | A | 12/1971 | Newlin |
| 3,837,691 | A | 9/1974 | Smythe |
| 3,897,161 | A | 7/1975 | Reinwall, Jr. |
| 4,049,357 | A | 9/1977 | Hamisch, Jr. |
| 4,117,998 | A | 10/1978 | Notoya |
| 4,143,422 | A | 3/1979 | Wilson |
| 4,143,446 | A | 3/1979 | Down |
| 4,236,281 | A | 12/1980 | Bottum |
| 4,379,358 | A | 4/1983 | Wibrow |
| 4,525,003 | A | 6/1985 | Tate, Jr. |
| 4,548,201 | A | 10/1985 | Yoon |

(Continued)

*Primary Examiner*—Robert J. Sandy
*Assistant Examiner*—Marcus Menezes
(74) *Attorney, Agent, or Firm*—Christensen O'Connor Johnson Kindness PLLC

(57) ABSTRACT

The present invention is a slip grip device, which permits a cord to be adjusted to any given position or length. It adjusts through a tension mechanism, while allowing the cord to break apart at a pre-determined pressure, thus ensuring safety in the event that the cord is inadvertently caught. An interference fit within keyways and keyway cavities of the mechanism allowing for anchoring a cord and adjusting its length. This mechanism serves as an anchor for the end of various types of cord, while enabling the cord to slip with a set resistance, while providing enough grip to hold at any desired length or location. The cord length can be readjusted and reset countless times. The device consists of two parts designed to fit together around the cord. The invention contains no moving parts and there is no glue, springs staples, wire, wax, nor heat used in assembly.

20 Claims, 4 Drawing Sheets

U.S. PATENT DOCUMENTS

| | | |
|---|---|---|
| 4,635,698 A | 1/1987 | Anderson |
| 4,771,516 A | 9/1988 | Foth |
| 4,912,814 A * | 4/1990 | McKenzie ............... 24/115 H |
| 5,208,950 A * | 5/1993 | Merritt ................... 24/115 H |
| 5,245,730 A * | 9/1993 | Martin ..................... 24/132 R |
| 5,283,930 A | 2/1994 | Krauss |
| D344,850 S | 3/1994 | Galmines et al. |
| 5,345,656 A | 9/1994 | Merritt |
| 5,416,925 A | 5/1995 | Davis |
| 5,461,726 A | 10/1995 | Wade |
| 5,493,731 A * | 2/1996 | Amnott ........................ 2/148 |
| 5,536,051 A | 7/1996 | Morin |
| 5,593,189 A | 1/1997 | Little |
| 5,611,578 A | 3/1997 | Angelico, Sr. et al. |
| 5,664,297 A | 9/1997 | Mandukian |
| 5,669,119 A | 9/1997 | Seron |
| 5,671,508 A * | 9/1997 | Murai ..................... 24/115 K |
| 5,675,128 A * | 10/1997 | Simon ................... 174/152 G |
| 5,765,227 A | 6/1998 | Wright |
| 5,829,105 A | 11/1998 | Matoba et al. |
| 6,044,527 A * | 4/2000 | Ishida et al. ............. 24/129 R |
| 6,094,783 A | 8/2000 | Parsons |
| 6,105,218 A | 8/2000 | Reekie |
| 6,158,095 A | 12/2000 | Lassiter |
| 6,322,112 B1 | 11/2001 | Duncan |
| 6,351,874 B1 | 3/2002 | Suggs |
| 6,618,910 B1 * | 9/2003 | Pontaoe ................... 24/115 H |
| 6,675,446 B2 | 1/2004 | Buettell |

* cited by examiner

SLIP GRIP DEVICE

CROSS REFERENCE TO RELATED APPLICATION

This application claims the benefit of U.S. Provisional Application No. 60/515,717, filed Oct. 31, 2003, priority from the filing date of which is hereby claimed under 35 U.S.C. § 119(e).

FIELD OF THE INVENTION

The present invention relates to a slip grip device, which permits a cord to be adjusted to any given position or length, while releasing the cord at a pre-determined pressure, thus ensuring safety in the event that the cord is inadvertently caught.

BACKGROUND OF THE INVENTION

Cords to wear jewellery, for clothing, to keep glasses on, in sports equipment and in industry are commonplace. However, in many cases these cords are neither adjustable nor safe for the user. Most require multiple steps to attach. Many are made of in expensive metal which can cause allergic problems. If catches are made from semi-precious metals, they are too expensive for regular use. Most metal catches can break too easily and repair is difficult or expensive. Alternatively, there are some sorts of plastic catches available. They are usually bulky, leave loose ends, have moving parts and assembly requires multiple steps and adhesives.

The jewellery industry mainly relies upon hand-tied knots to provide an affordable, adjustable, aesthetic method of completing the cords. There are many problems associated with the use of knots. Consistency is virtually impossible. Tying of the knots is a physically burdensome chore. If the knots are too tight, it can be very difficult to adjust the length of the cord. It will grip, but will not slip. If the knots are too loose, they will slip, but not grip. Furthermore, they unravel and come undone. Long-term use of knots causes fraying of the cord. Also, as good tight knots can be as strong as the cord, a danger can be posed to the user should the cord be inadvertently caught.

A recent example of a related slip grip device is a patent entitled "Cord Clamp", which issued as U.S. Pat. No. 6,618,910 (Pontaoe 2003).

SUMMARY OF THE INVENTION

According to the present invention there is provided a slip grip cord adjustment device, which includes a first body and a second body. A tapered channel is provided in at least one of the first body or the second body. The tapered channel is adapted to receive an anchored cord and a sliding cord. Means are provided for anchoring one end of the anchored cord to one of the first body or the second body. A first compression member is positioned on the first body. A second compression member is positioned on second body. The first compression member and the second compression member are adapted to cooperatively exert a compressive force upon the anchored cord. First engagement means are provided on the first body. Second engagement means are provided on the second body. The second engagement means are adapted to engage the first engagement means to hold the first body and the second body together and cause the first compression member and the second compression member to exert a compressive force upon the anchored cord positioned in the tapered channel. This causes the anchored cord to spread outwardly and exert an interference force upon the sliding cord to resist sliding movement of the sliding cord until a predetermined force threshold is reached.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1A:
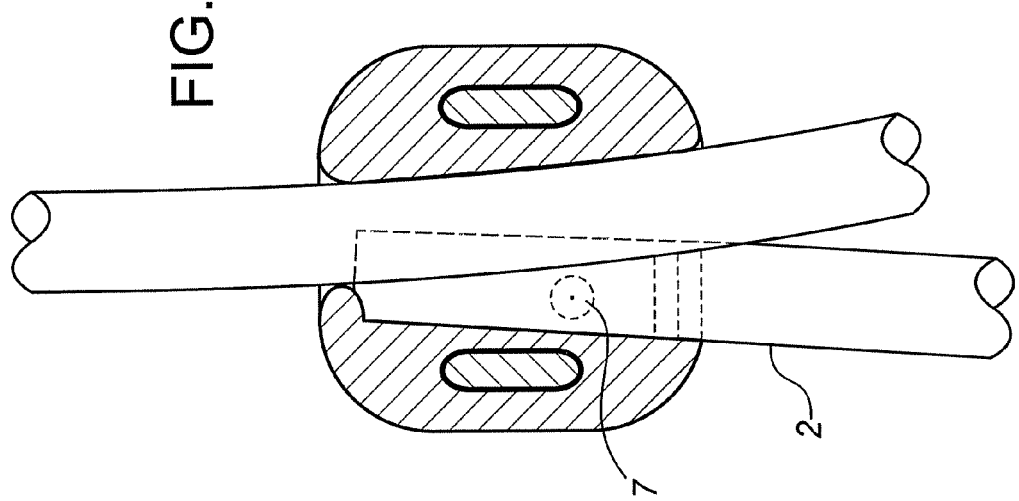
FIG. 1A is a top plan view, in section, which shows the position of the anchored and the sliding cord in the catch base. The anchor pin position is shown in the anchored cord. Cross-hatched portions show the interference compression area. Keyway cavity location, end enclosure and radius inlet/outlet are shown.

The preferred embodiment, a slip grip device generally identified by reference numeral 10, will now be described with reference to FIG. 1 through FIG. 7.

Figure 1:
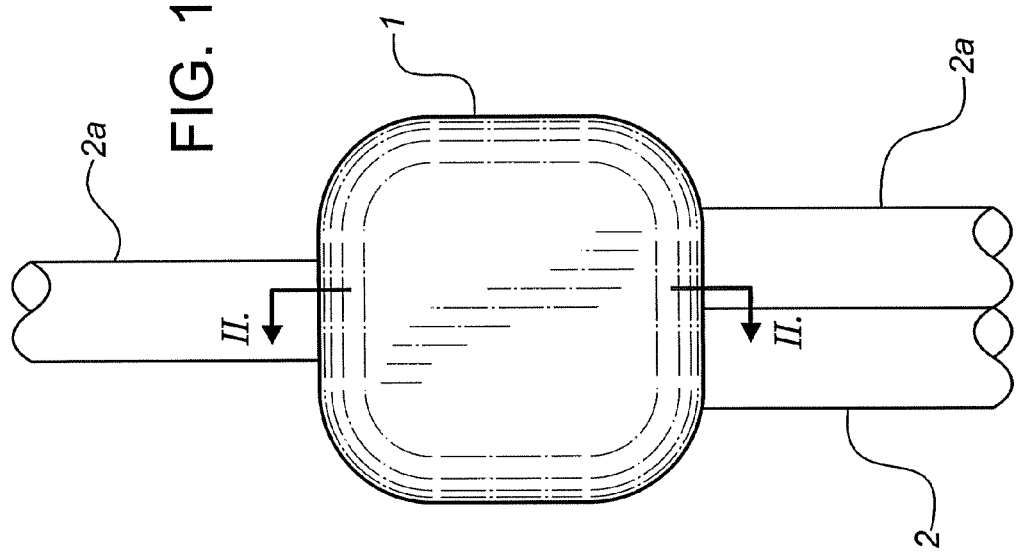
FIG. 1 is a top plan view which shows the sliding cord and anchored cord assembled within the catch mechanism.

Structure and Relationship of Parts:

The present invention, as shown in FIG. 1, comprises a catch mechanism in which the length of a cord 2 can be held fast and adjusted (cord 2a) to fit the use of without any loose ends. The catch mechanism, as shown in FIG. 1(a), shows the interference fit of the anchored cord 2 and the sliding cord 2a due to the longitudinal taper of the cord cavity. This also shows the location of the anchor pin 7 in relation to the anchored cord 2.

Figure 2:
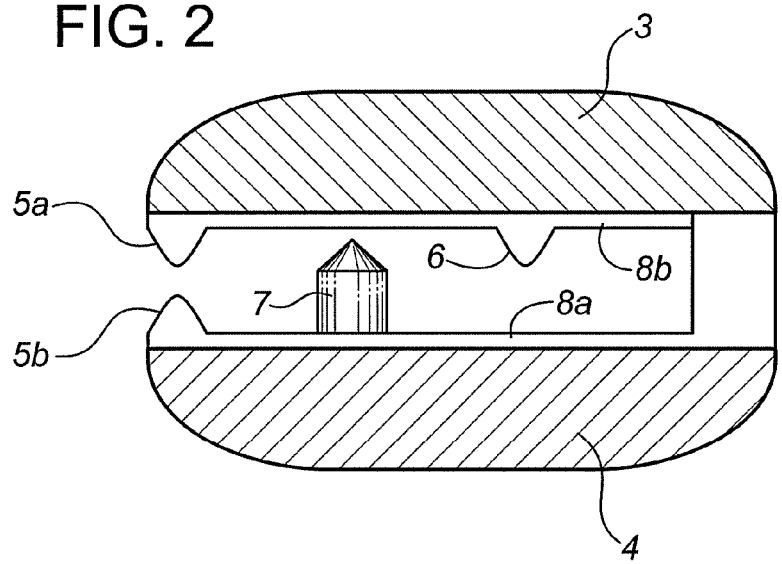
FIG. 2 is a side elevation view, in section, which shows the assembled catch mechanism with the front outside prongs (bottom and top), compression ledges, end enclosure and anchor pin and anchoring pin prong shown.

The catch mechanism, as shown in FIG. 2, comprises a top portion 3 and a bottom portion 4. The top portion 3 has an outside prong 5(a) with a triangular cross-section centre that grips and centres the cord 2, preventing the cord 2 from slipping and a hold down prong 6 that forces the cord 2 into the base of the anchor pin 7 to a maximum pressure without impeding the assembly of the top portion 3 and the bottom portion 4. The anchor pin 7 arises from the bottom portion 4 mid-way between the outside prong 5(a) and the hold down prong 6. The bottom portion also has an outside prong 5(b) with a triangular cross-section centre that grips and centres the cord 2 preventing the cord 2 from slipping. FIG. 2 also shows the side view of the compression ledge 8(b) on the top portion 3 and the compression ledge 8(b) on the bottom portion 4 that are both adjacent to the anchor pin 7.

Figure 3:
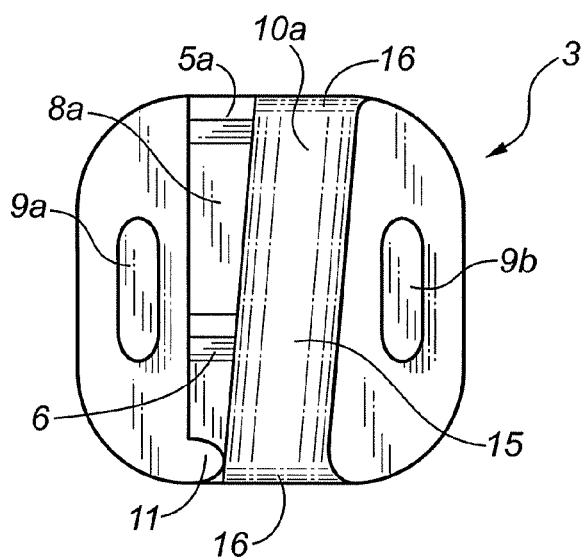
FIG. 3 is a bottom plan view of the top portion of the catch mechanism that shows the position of the keyways, tapered length of the longitudinal cavity, the raised compression ledge that acts to compress the anchored cord, the anchor hold down prong that forces the cord into the base of the anchor pin and the sliding cavity The radiused edges on the inlets and outlets are also shown.
Figure 3A:
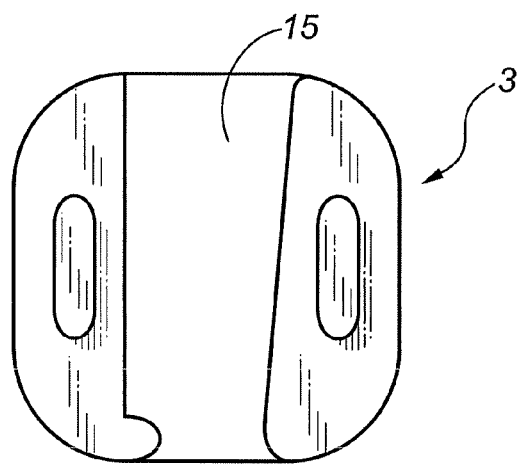
FIG. 3A a modified bottom plan view of the top portion which shows the longitudinal taper in the cord cavity.

FIG. 3 shows the tapered raised compression ledge 8(b) of the top portion inside the outside prongs 5(a), that forces the cord 2 into the anchor pin and allows for the interference fit of the top portion and bottom portion of the catch mechanism after assembly. The radiused inlets/outlets 16, which guide and protect the sliding cord 2 from wear are shown. The end assembly 11 encloses the end of the anchored cord 2. The top sliding cavity 10(a) holds the sliding cord 2a. The walls of the elongated keyway pin 9(a) and keyway pin 9(b) are parallel to each other and are rounded at the ends to ease insertion into the keyway cavities of the bottom portion of the catch mechanism. The keyway pins 9(a) and 9(b) are slightly less in length that the depth of the keyway cavities on the bottom portion of the catch mechanism to allow for compression of air during assembly. The outside prong 5(a) is 90 degrees to the elongated keyway pins 9(a) and 9(b) on the anterior end of the compression ledge 8(b) of the top portion. The hold down prong 6 is also perpendicular to the elongated keyway pins 9(a) and 9(b) on the posterior end of the compression ledge 8(b). The compression ledge 8(b) acts to compress the anchored cord 2 by forcing an increase in width which increases the compression by forcing the anchored cord into the sliding cord 2a, The end of the cord 2 is compressed further by the lengthwise taper of the sliding cord cavity 15, which therefore interferes with the sliding cord 2a, increasing the tension of the slide, as also indicated in the cross-hatched portion of FIG. 1A. The end stop 11 positions the cord 2 for assembly of the catch mechanism and encloses and encapsulates an end of the anchored cord 2. FIG. 3(a) shows the longitudinal taper in the cord enclosures.

Figure 4:
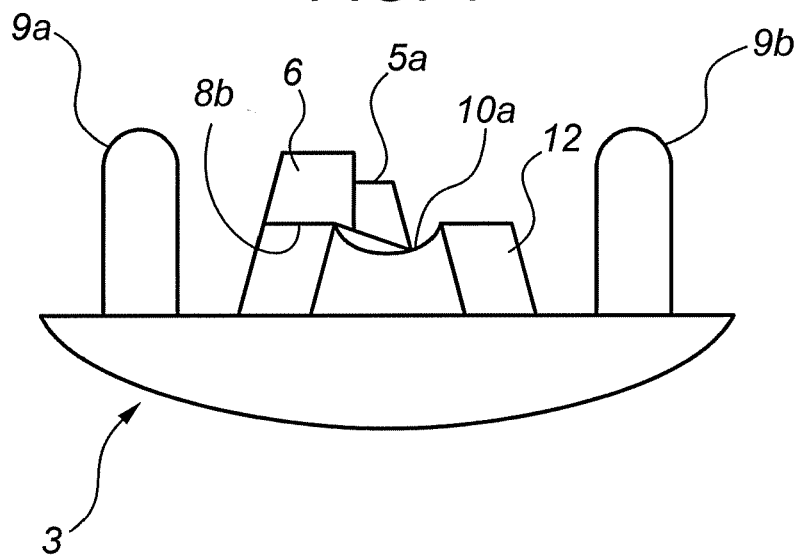
FIG. 4 is an end elevation view of the top portion of the catch mechanism, which shows the location of the keyway pins, the top section of the sliding cord cavity, the anchor hold-down prong, the front-centring hold down prong, the raised section which fills the extended cord base cavity.

FIG. 4 shows the end elevated view of the top portion 3 of the catch mechanism. The raised section 12 is inserted into the lower section 4, filling the cord cavity upon assembly. The top portion of the sliding cavity 10(a) is shown as well as the radiused ends of the keyway pins 9(a) and 9(b). The position of the upper compression ledge 8(b) is shown in relation to the sliding cavity 10(a). The relationship of the size and the location of the anchor hold down pin 6 to the front prong 5(a) which centers the anchored cord 2 as it leaves the mechanism are shown in this view.

Figure 5:
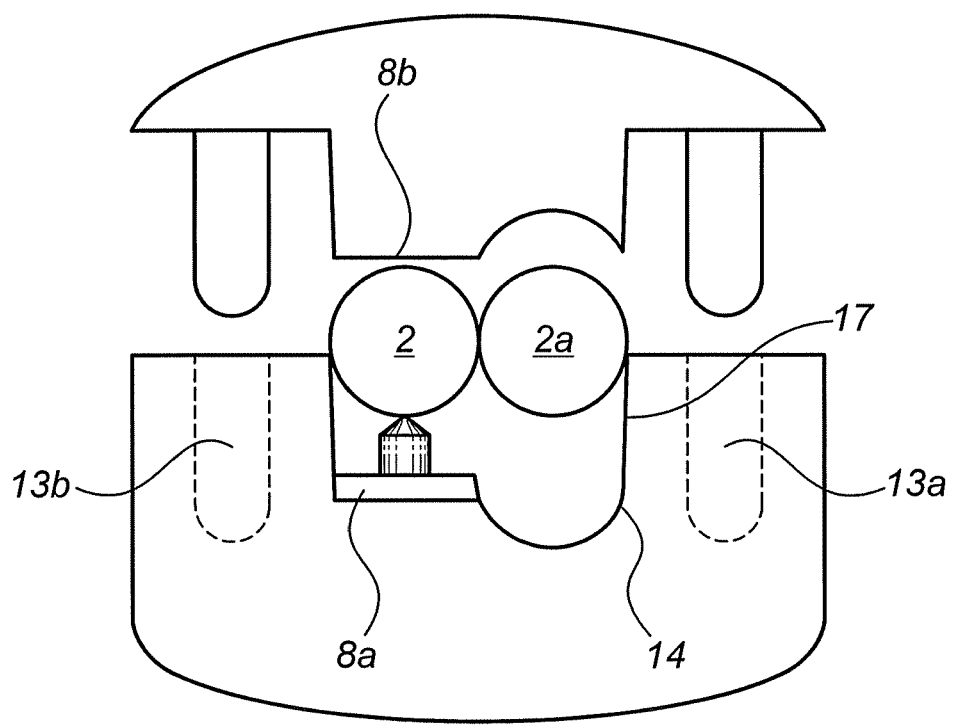
FIG. 5 is an exploded end elevation view, in section, of the top and bottom portion of the catch mechanism prior to assembly, which shows the location of the cords within the extended cord cavity before assembly, the location of the anchor pin relative to the cord to be anchored, compression ledges (top and bottom), top and bottom sliding cavity, the front prong (top and bottom), the cord to be anchored and the sliding cord. It also shows the extension of the depth of the cord cavity that allows for the placement of the cord within the catch mechanism to fit with the bottom and directing the cord into the keyway cavity.

The end view of the top and bottom portions of the catch mechanism prior to assembly is shown in FIG. 5. The anchored cord 2 and the sliding cord 2a are shown in place for assembly into the extended cord cavity 17. The relative location of the anchor pin is shown prior to piercing the anchored cord 2. The cords will be compressed into the vertical tapered cord cavity 17 and the longitudinal taper 15 as shown in FIG. 1A. The compression ledges 8(a) and 8(b) also act to compact the cord 2 furthering the compression. FIG. 5 also shows the keyway cavities 13(a) and 13(b) and the tapered walls 14 which when assembled with the top portion of the catch mechanism force the cord 2 into the taper bringing the meeting edges of the cords tighter together and further compressing and determining the pullability of the sliding cord 2a.

Figure 6:
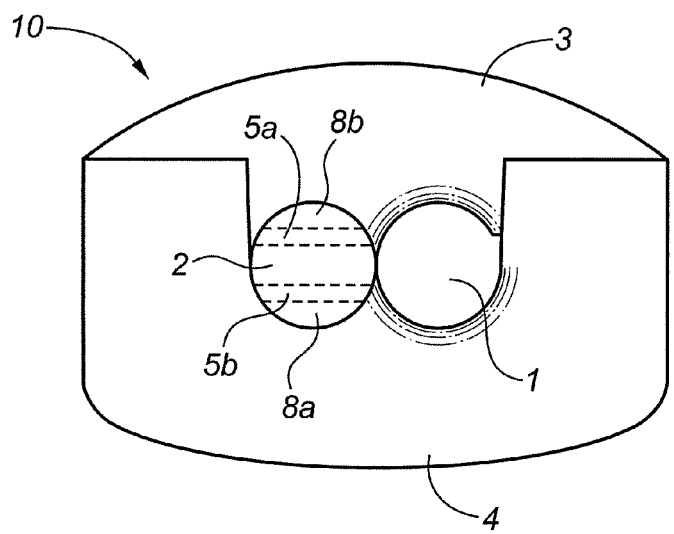
FIG. 6 an end elevation view of the top and bottom portions of the catch mechanism after assembly. The hidden lines show the compression ledges and the front prongs position when compressed.

The end view of the assembled catch mechanism is shown in FIG. 6 The anchored cord 2 and the sliding cord 2a are shown in place within the mechanism The hidden lines on the anchored cord 2 show the amount of compression and the penetration of the front prongs 5(a) and 5(b) and the compression ledges 8(a) and 8(b).

Figure 6A:
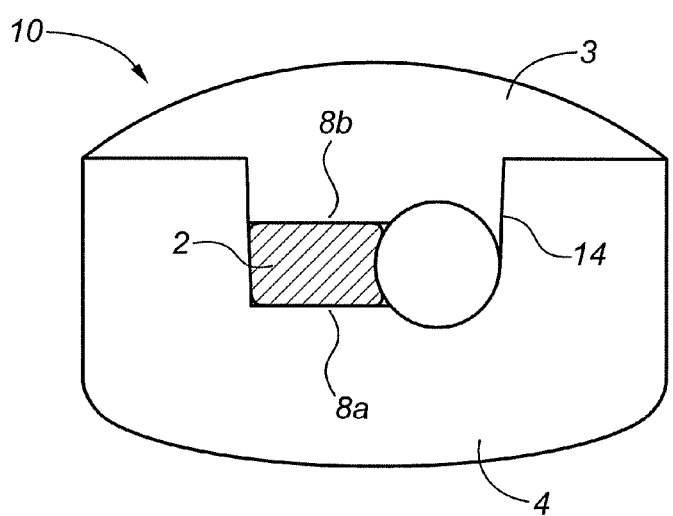
FIG. 6A is an end elevation view, in section of the assembled catch mechanism illustrated in FIG. 6, the cross-hatched section shows how the three types of compression on the cord (longitudinal taper, vertical taper and compression ledges) alter the shape of the anchored cord and force tension on the sliding cord.

FIG. 6(a) shows the resulting compacting of the anchored cord 2 by the compression created by three methods, the longitudinal taper, the vertical taper 14 and the compression ledges 8(a) and 8(b). They alter the shape of the anchored cord and force tension on the sliding cord.

Figure 7:
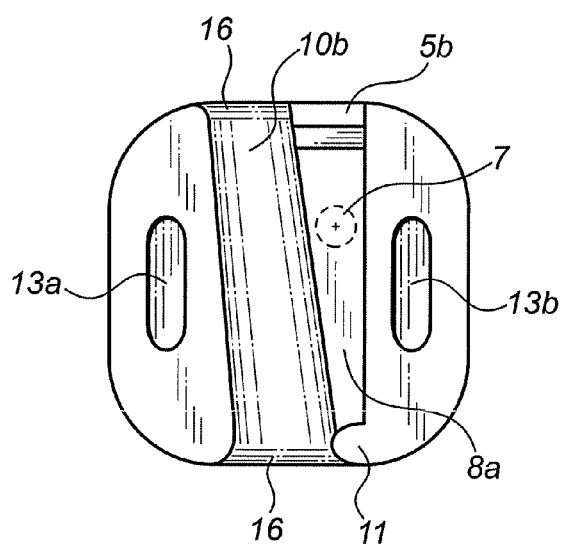
FIG. 7 is a top plan view of the bottom portion of the catch mechanism, which shows the position of the keyway cavities, the anchor pin, the outside prong, the radius inlets and outlets, the compression ledges and the sliding cord cavity.

The bottom view of the bottom portion of the catch mechanism, as shown in FIG. 7, demonstrates the shape and position of the elongated keyway cavities 13(a) and 13(b), the anchor pin 7, the outside prong 5(b), the sliding cord cavity 10(b), the end stop 11 and the compression ledge 8(a) of the bottom portion. One or more anchor pins 7 provide a breakaway mechanism. Anchor pin 7 can be elongated on the sides toward the cord pull. The degree of breaking strength of the mechanism is determined by the length, the width, the material of, the number of, the height of the parallel sides of, and the extent of the elongation of the anchor pins. Anchor pin 7 has straight, parallel sides with a tapered end which may allow penetration into the cord. The exterior wall of the sliding cord cavity and the exterior wall of the anchor cord cavity are not parallel This creates a longitudinal taper compressing the cords together as shown in FIG. 1(a) The radius cut 16 on the inlet and outlet of the bottom portion eliminates chafing of the cord, allows the cord to smoothly be pulled at an angle to the outlet and allows the cord to pull without binding. The keyway cavities 13(a) and 13(b) on the bottom portion are each slightly smaller than the inserting keyway pins 9(a} and 9(b) on the top portion of the catch mechanism This creates an interference fit that allows assembly and affixing of the top portion 3 and bottom portion 4 The walls of keyway cavities 13(a) and 13(b) are parallel to each other to create holding power and are of sufficient thickness to prevent distortion or to lose the interference fit. The depth of the keyway cavities 13(a) and 13(b) are also deeper than the length of the keyway pins 9(a) and 9(b) to allow for total closure of the catch mechanism.

Operation:

The operation of the slip grip device can best be understood by reviewing the various functions which the slip grip device performs.

Engaging and Holding Anchor Cord

This is accomplished within the slip grip components through use of compression plates 8(*a*) and 8(*b*), prongs 5(*a*) and 5(*b*), prong 6 and anchor pin 7. The anchor cord is compacted by the application of the compressing plates narrowing the anchor cord chamber. Prongs 5(*a*) and 5(*b*) further compress the cord at localized points. Prong 6 provides further localized compression of the cord by forcing the cord toward the base end of the anchor pin. The anchor pin engages the cord by indenting and compressing into the surface of the anchor cord. If the anchor pin is small in diameter and the cord is permeable, the pin may penetrate the cord. Penetration is not necessary but can occur in certain materials. Alternatively, as the anchor pin is elongated and enlarged to increase or decrease the breakaway, the pin may just engage the cord, exerting pressure without penetration (piercing).

Operation of Sliding Cord for Purposes of Adjustment

Friction is provided by frictional contact of the two cords anchor cord 2 and sliding cord 2*a* and the cavity containing them. Rather than a single point or several isolated points of contact, there is full length interior contact, which generates greater friction. The greater the amount of frictional contact the smoother the sliding action as greater surface area contact diminishes the effect of variations of the cord surface. The cords are positioned side by side with full contact the entire length of the cavity of the slip grip device. There are a number of factors which contribute to full length contact being maintained. Friction is applied through use of two dimensional tapering, both longitudinally and vertically (transversely). Longitudinal taper 15 runs within the entire length of the cavity. The amount of friction changes with the variation of the width at the wide part and the width at the narrow part of the taper. The width of the longitudinal taper cavity affects the preload of the two cords: the tighter the fit of the preloaded cords, the greater the friction. Altering the degree of taper further effects the amount of friction applied to the sliding cord as it determines the interference fit of the two cords. The degree of vertical taper affects the friction. As the cords are forced together by the compression plates into the bottom of the narrowing cavity, the sliding cord and the anchor cords are forced together creating friction along the contact of the anchor cord and the sliding cord. As the bottom of the cavity narrows, the sliding cord and the anchor cords are forced tighter together. By changing the included angle of the vertical taper, the frictional pressure on the sliding cord can be altered. The closer the end of the anchor cord is to the anchor pin 7, the less friction is applied to the sliding cord as there is less lineal contact against the sliding cord. As the end of the anchor cord moves toward the cap end increasing the distance between the anchor pin and end of the anchor cord, friction against the sliding cord increases as more contact area and greater interference are provided. The amount of compression on the anchor cord is one of the factors that determines the pressure on the sliding cord. As the cords are compressed between the compression plates on the top and bottom of the anchor cord cavity and against the outside angled vertical side wall of the anchor cord cavity, the compression forces the sliding cord contact side of the anchor cord and the contact side of the sliding cord together. This allows the anchor cord to exert greater pressure against the sliding cord, as this is the only direction the anchor cord can move as it is contained within the cavity on the other three sides. This results in the sliding cord transmitting outward pressure against the containment walls of the sliding cord cavity as well as the anchor cord. The closer the sliding cord cavity is to the size of the cord, the greater the friction effect upon the sliding cord. A tighter fitting sliding cord cavity increases the amount of friction against the sliding cord. Similarly, the closer the anchor cord cavity is to the size of the anchor cord, the greater the friction effect upon the sliding cord. A tighter fitting anchor cord cavity increases the amount of friction against the sliding cord. It is preferred that sliding cord cavity be the same shape as the cross-sectional shape of the sliding cord to allow greater contact and to maintain the initial cross-sectional shape of the sliding cord. Similarly, the closer the anchor cord cavity is to the shape of the anchor cord, the greater the applied frictional pressure upon the sliding cord. Localized pressure points created by prongs 5(*a*) and 5(*b*) provide additional holding compression on the anchor cord. This additional holding compression expands the localized points into the sliding cord by forcing the compressed points of contact toward the sliding cord increasing the friction at these points. Prong 6, like prongs 5(*a*) & 5(*b*), provides further compression of the anchor cord into the sliding cord. As the compression increases the cord spreads into the sliding cord at that point of contact. When the inside edge of the end cap and the exterior anchor wall cavity are radiussed, it acts as an incline plane and further directs the end of the anchor cord into the sliding cord. Forcing the cord against the end cap, upon assembly, allows for more frictional pressure against the sliding cord, through the mushrooming effect the preloading lateral force creates on the anchor cord.

With many types of cord, the tension tends to improve over time, by becoming tighter and smoother. A contact friction point is very wide (length of the slip grip) the sliding cord and the anchor cord, over time, mate or lap together for smoother movement. Noticeable impact of variations in cord diameter is lessened, because of the wide contact area of the anchor cord and the sliding cord, allowing the sliding cord to move against the anchored cord with more consistent action. Like the softening effect of long-term use on a pair of stiff new blue jeans, cord softens and fluffs and expands to accommodate itself around the adjoining cord and into the containment cavity. When the cord is new it is condensed and through use the fibres become less tightly wound and action becomes silky smooth. Note that this point mainly applies to certain cords, for example cotton materials.

By creating a sliding cord cavity of the same shape and size as the cord, the cavity partially contains and accommodates the cord. Force exerted on the compressed anchored cord will be transmitted through the sliding cord forcing pressure toward the opposite wall of the sliding cavity, echoing the pressure back toward the centre; thus the cord is compressed into the shape of the sliding cord cavity maintaining the original cord shape. Rather than losing pressure at a single contact point, force is exerted around the cord back into the middle, so it comes out radially; thus maintaining the original shape of the cord. The sliding cord will maintain its original shape if the sliding cord cavity is made to fit the cord size and shape. Therefore, the action remains consistent. Friction between anchor cord and sliding cord increases as the anchor cord is forced against the sliding cord at contact area. By increasing the amount of cord contact, greater friction can be achieved, as shown in FIG. 1A. Complimentary cavity/cord shape keeps cord in original cross-section shape. The smaller the tolerance of cord to the sliding cord cavity, the greater the influence of friction from anchor cord to sliding cord. This applies equally to for anchor cord. Compression of anchor cord between compression plates and the anchor cord side cavity force expansion of the anchor cord to only go towards sliding cord creating friction.

Operation of Breakaway Mechanism.

Lateral movement of the anchor cord within the slip grip cavity initiates the breakaway mechanism. As lateral movement of the anchor cord increases, the lateral pull overcomes the compression force of the plates, the compression points of prongs 5(*a*), 5(*b*) and 6 and the compression indent force of the anchor pin. As the cord moves along the inclined planes of 5(*a*) and 5*b*, the inclined plane of the top of the anchor pin and the inclined plane of prong 6, outward pressure is applied into parts 3 and 4 (the top and bottom of the slip grip assembly) exerting pressure on the keyway pins 9(*a*) and 9(*b*) and keyway cavities 13(*a*) and 13(*b*). When the pressure becomes great enough, it overcomes the interference fit and lifts the top, releasing the cord. The degree of interference between keyway cavity and keyway pins determines the amount of outward pressure required to initiate breakaway.

Breakaway is partially created by the anchor pin shape and size combined with the interference fit on the two pins and cavities which hold the top and bottom portion of the clasp together. If the anchor pin is narrow compared to its height (higher than it is wide), when the anchor cord is pulled, the pin can bend to give the breakaway. When the cross-section of the anchor pin is elongated, at a point where the elongation is greater than the height of the pin, the pin may no longer bend or break at that point. As the anchor cord is pulled, the cord will ride up along the top of the anchor pin and the interference fit of the top to the bottom will partially release allowing the cord to slip over the top of the anchor pin and break away. A predetermined breakaway point is created through altering the size of the anchor pin, the amount of interference in combination with the front prongs 5(*a*) and 5(*b*) and prong 6 and the compression of the cord. The breakaway point can be set to a predetermined pressure point variable (based on size and material) potentially anywhere from ounces to tons. This allows a safety factor to be set for the slip grip. Degree of interference on keyway pins 9(*a*) and 9(*b*) and keyway cavities 13(*a*) and 13(*b*) determines the breakaway point. Breakaway occurs when top (3) and bottom (4) separate and the anchor cord is released. When the anchor cord moves along the inclined planes of 5(*a*), 5(*b*), 6 and top of anchor pin, the increased outward pressure separates the top (3) and bottom (4) as the pressure overcomes the interference fit of the pin and the cavity. Outward pressure on top and bottom breaks contact of interference/pin/cavity 9(*a*) and 9(*b*) and 13(*a*) and 13(*b*) separates the top and bottom of the slip grip allowing for release of the anchor cord. The breakaway pressure point is partially determined by the size and shape and material of the cord and the slip grip. Prongs 5(*a*) and 5(*b*) and 6 all taper to allow easier and controllable lateral movement. The steeper the incline angle of the prongs 5(*a*) and 5(*b*) and prong 6 and top of anchor pin, the greater the force required to separate the top (3) and the bottom (4) and achieve breakaway. As enough pressure is applied to cause the anchor cord to begin to move, the anchor cord is forced to follow the inclined planes of 5(*a*), 5(*b*) and the top of the anchor pin. When the applied pressure pulling the anchor cord and moving up the incline plane is great enough, the top (3) and bottom (4) will separate releasing the anchor cord. When the pull on the anchor cord outweighs compression pressure from plates, 5(*a*), 5(*b*) and 6 and anchor pin, the lateral movement creates outward pressure as the cord rises up the inclined planes. Release of the top and bottom pin/cavity is dependant upon the degree of interference. A pre-determined release pressure point can be achieved by adjusting the degree of interference between pin and cavity. Movement of the anchor cord is affected by the degree of angle of the inclined plane of 5(*a*), 5(*b*) and 6. The steeper the angle of the inclined plane, the greater is the pressure exerted on the anchor cord required to separate the top and bottom and release the anchor cord.

The designed slip grip mechanism is more durable, more consistent, more easily adjusted and safer than any other type of catch now available. The present invention, unlike the prior art, is specifically designed to have only two pieces with no moving parts, be easily assembled and have a built in tension mechanism that is capable of being used effectively on cord of varied size and type. The present invention can be used as an attractive, cost-effective, efficient anchoring device for cord necklaces. As the invention could be developed into any size, it could be used for cords on glasses or for hanging pictures. It could be used to attach a watch, key chain or as a bag fastener. It could be used to close sports bags, purses, or sports equipment. It could be used to attach gear to roof racks. It could be used to organise office supplies or kitchen utensils. It could be used to hang toys for small children as it has the breakaway function. It could be used to keep any equipment in place: tarps, wall paper, sleeping bags and the like. It could be used by people impaired by arthritis, as it does not require difficult tying or fastening. It could be used for camping equipment or for hobby equipment. It could be used in the medical world for such things as IV's and adjustable slings. There are countless industrial applications. Anywhere that adjustability of a gripping cord is required could use this invention. And it can be reused and reset countless times.

This present invention has only two parts, greatly simplifying assembly and increasing cost-effectiveness. It can be made in any size and will accommodate varied types of cord material. The exterior can be made in varied colours and shapes. It could even be imprinted with a company logo. The invention is durable safe and clean.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A slip grip cord adjustment device, comprising:
a first body;
a second body;
a tapered interior defined by at least one of the first body or the second body, the tapered interior being adapted to receive both an anchored cord and a sliding cord in side by side relation with full length interior contact, the sliding cord sliding during usage to permit cord adjustment;
means for anchoring one end of the anchored cord to one of the first body or the second body;
a first compression member on the first body;
a second compression member on second body, the first compression member and the second compression member being adapted to cooperatively exert a compressive force solely upon the anchored cord;
first engagement means on the first body; and
second engagement means on the second body, the second engagement means being adapted to engage the first engagement means to hold the first body and the second body together and cause the first compression member and the second compression member to exert a compressive force upon the anchored cord positioned in the tapered interior, thereby causing the anchored cord to spread outwardly and exert an interference force along a portion of a length of the sliding cord in full length interior contact with the anchored cord to resist sliding movement of the sliding cord until a predetermined force threshold is reached.

2. The slip grip cord adjustment device as defined in claim 1, wherein the first engagement means is one of a male member or a female receptacle and the second engagement means is the other of the male member or the female receptacle.

3. The slip grip cord adjustment device as defined in claim 1, wherein the engagement means is a friction fit locking engagement and at the predetermined force threshold, the engagement means holding the first body and the second body together separate, thereby releasing the anchored cord.

4. The slip grip cord adjustment device as defined in claim 1, wherein the means for anchoring one end of the anchored cord is an upstanding cord engaging member and at the predetermined pressure threshold, the upstanding cord engaging member bends and releases the anchored cord.

5. The slip grip cord adjustment device as defined in claim 4, wherein the cord engaging member is secured to one of the first body or the second body and a pressure member is provided on the other of the first body and the second body to maintain the anchored cord in engagement with the cord engaging member.

6. The slip grip cord adjustment device as defined in claim 1, wherein the means for anchoring one end of the anchored cord includes a first prong on the first body and a second prong on the second body, the anchored cord being clamped between the first prong and the second prong when the first engagement means and the second engagement means are engaged.

7. The slip grip cord adjustment device as defined in claim 1, wherein an end stop impinges into the tapered interior to enclose the one end of the anchored cord and create a narrowing which increases friction upon the sliding cord.

8. The slip grip cord adjustment device as defined in claim 1, wherein the tapered interior has radiused end portions, thereby reducing chafing of the sliding cord.

9. The slip grip cord adjustment device as defined in claim 1, wherein a sliding cavity is provided in the tapered interior to accommodate sliding cord, the sliding cavity being formed from a first recessed cavity on first body and a second recessed cavity on second body.

10. The slip grip cord adjustment device as defined in claim 9, wherein the sliding cavity is of substantially the same cross-sectional dimension as the sliding cord.

11. The slip grip cord adjustment device as defined in claim 1, wherein the tapered interior is tapered in two dimensions.

12. A slip grip cord adjustment device, comprising:
a first body;
a second body;
a tapered interior defined by at least one of the first body or the second body, the tapered interior tapered in two dimensions and being adapted to receive both an anchored cord and a sliding cord in side by side relation with full length interior contact, the sliding cord sliding during usage to permit cord adjustment;
means for anchoring one end of the anchored cord including a pressure member on the first body and an upstanding cord engaging member secured to the second body;
a first compression member on the first body;
a second compression member on second body, the first compression member and the second compression member being adapted to cooperatively exert a compressive force solely upon the anchored cord;
a sliding cavity is provided in the tapered interior to accommodate sliding cord, the sliding cavity is of substantially the same cross-sectional dimension as the sliding cord and is formed from a first recessed cavity on first body and a second recessed cavity on second body;
first engagement means on the first body; and
second engagement means on the second body, the second engagement means being adapted to engage the first engagement means to hold the first body and the second body together, cause the pressure member to force the anchored cord into engagement with the cord engaging member, and cause the first compression member and the second compression member to exert a compressive force upon the anchored cord positioned in the tapered interior, thereby causing the anchored cord to spread outwardly and exert an interference force along a portion of a length of the sliding cord in full length interior contact with the anchored cord to resist sliding movement of the sliding cord until a predetermined force threshold is reached.

13. The slip grip cord adjustment device as defined in claim 12, wherein the first engagement means are male members on the first body and the second engagement means are female receptacles on the second body.

14. The slip grip cord adjustment device as defined in claim 13, wherein the male members and the female receptacles are engaged in a friction fit locking engagement.

15. The slip grip cord adjustment device as defined in claim 12, wherein the means for anchoring one end of the anchored cord includes a first prong on the first body and a second prong on the second body, the anchored cord being clamped between the first prong and the second prong when the first engagement means and the second engagement means are engaged.

16. The slip grip cord adjustment device as defined in claim 12, wherein an end stop impinges into the tapered interior to enclose the one end of the anchored cord an create a narrowing which increases friction upon the sliding cord.

17. The slip grip cord adjustment device as defined in claim 12, wherein the tapered interior has radiused end portions, thereby reducing chafing of the sliding cord.

18. The slip grip cord adjustment device as defined in claim 12, wherein at the predetermined force threshold, the upstanding cord engaging member bends, thereby releasing the anchored cord.

19. The slip grip cord adjustment device as defined in claim 12, wherein the engagement means is a friction fit interlocking engagement and at the predetermined force threshold, the engagement means holding the first body and the second body together separate, thereby releasing the anchored cord.

20. A slip grip cord adjustment device, comprising:
a first body;
a second body;

a tapered interior formed when the first body and the second body are connected, the tapered interior tapered in two dimensions and adapted to receive both an anchored cord and a sliding cord in side by side relation with full interior contact, the sliding cord sliding during usage to permit cord adjustment, the tapered interior having radiused end portions, thereby reducing chafing of the sliding cord;

means for anchoring one end of the anchored cord including a pressure member on the first body, an upstanding cord engaging member secured to the second body, a first clamping member on the first body and a second clamping member on the second body;

an end stop impinges into the tapered interior to enclose the one end of the anchored cord;

a first compression member on the first body;

a second compression member on second body, the first compression member and the second compression member being adapted to cooperatively exert a compressive force solely upon the anchored cord;

a sliding cavity is provided in the tapered interior to accommodate sliding cord, the sliding cavity is of substantially the same cross-sectional dimension as the sliding cord and is formed from a first recessed cavity on first body and a second recessed cavity on the second body;

first engagement means in the form of mate members on the first body; and second engagement means in the form of female receptacles on the second body, the second engagement means being adapted to engage the first engagement means in a friction fit locking engagement to hold the first body and the second body together, cause the anchored cord to be clamped between the first clamping member and the second clamping member, cause the pressure member to force the anchored cord into engagement with the cord engaging member, and cause the first compression member and the second compression member to exert a compressive force upon the anchored cord positioned in the tapered interior, thereby causing the anchored cord to spread outwardly and exert an interference force along a portion of a length of the sliding cord in full length interior contact with the anchored cord to resist sliding movement of the sliding cord along the sliding cavity until a predetermined force threshold is reached at which time either the upstanding cord engaging member bends or the first engagement means and the second engagement means holding the first body and the second body together separate, thereby releasing the anchored cord.

* * * * *

UNITED STATES PATENT AND TRADEMARK OFFICE
CERTIFICATE OF CORRECTION

PATENT NO. : 7,237,307 B2  Page 1 of 1
APPLICATION NO. : 10/978883
DATED : July 3, 2007
INVENTOR(S) : J.P. Feschuk It is certified that error appears in the above-identified patent and that said Letters Patent is hereby corrected as shown below:

| COLUMN | LINE | ERROR |
|---|---|---|
| On Title Page Item (76) Pg. 1, col. 1 | Inventor | "J Peter Feschuk," should read --J. Peter Feschuk,-- |
| Item (76) Pg. 1, col. 1 | Inventor | "4320 Hammond Bay" should read --4230 Hammond bay-- |
| 10 (Claim 16, | 49 line 3) | "cord an create" should read --cord and create-- |
| 12 (Claim 20, | 1 line 30) | "mate" should read --male-- |

Signed and Sealed this

Second Day of October, 2007

JON W. DUDAS
*Director of the United States Patent and Trademark Office*